No. 812,054. PATENTED FEB. 6, 1906.
M. LENHART.
ADJUSTABLE WAGON BOX.
APPLICATION FILED SEPT. 6, 1905.
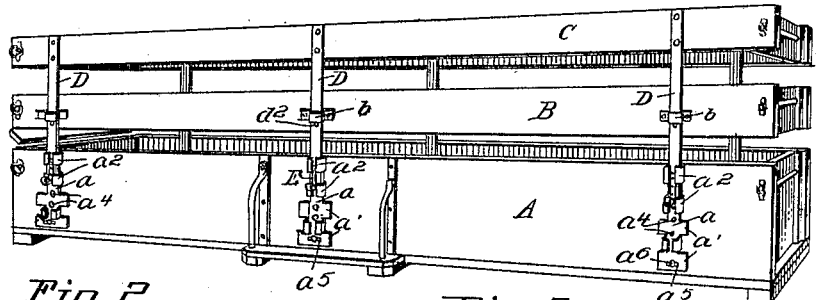
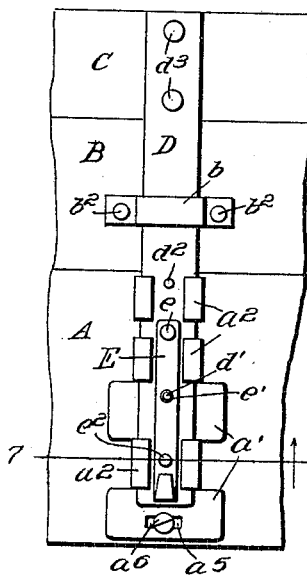
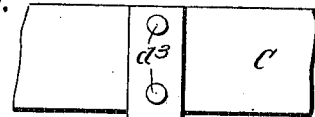
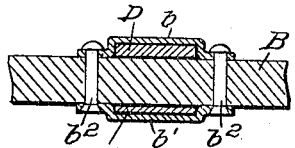
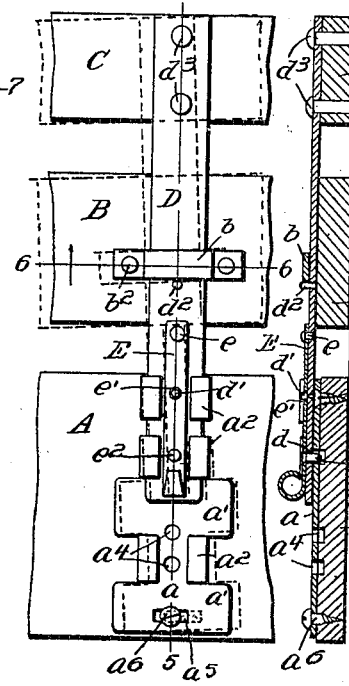
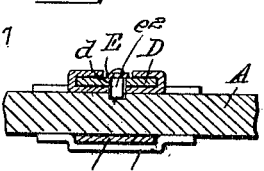
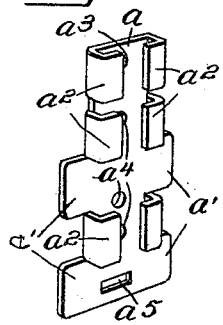
Witnesses
F. C. Gibson.
L. B. Bridges
Inventor
Moses Lenhart,
By Davis & Davis,
Attorneys

UNITED STATES PATENT OFFICE.

MOSES LENHART, OF CHARITON, IOWA.

ADJUSTABLE WAGON-BOX.

No. 812,054.　　　　　Specification of Letters Patent.　　　　　Patented Feb. 6, 1906.

Application filed September 6, 1905. Serial No. 277,231.

*To all whom it may concern:*

Be it known that I, MOSES LENHART, a citizen of the United States of America, and a resident of Chariton, county of Lucas, State of Iowa, have invented certain new and useful Improvements in Adjustable Wagon-Boxes, of which the following is a full and clear specification, reference being had to the accompanying drawings, in which—

Figure 1 is a perspective view of a wagon-box provided with my improvements, the racks being raised; Fig. 2, a side elevation of one of the supports or standards in its lowermost position; Fig. 3, a similar view showing the standard raised sufficiently to elevate the uppermost rack or frame; Fig. 4, a similar view showing the standards raised sufficiently to elevate both the racks or frames; Fig. 5, a vertical sectional view on the line 5 5 of Fig. 4; Fig. 6, a horizontal sectional view on the line 6 6 of Fig. 4; Fig. 7, a horizontal section on the line 7 7 of Fig. 2; Fig. 8, a detailed perspective view of one of the sockets for the standards.

The object of this invention is to provide simple and inexpensive means for attaching a pair of superposed frames or boxes to the main wagon-boxes in such manner that said supplemental boxes may be permitted to rest upon the upper edge of the main box and form a continuous extension thereof or be elevated and spaced with reference to each other and the main wagon-box to form a cage or rack for use in hauling hogs, manure, &c., as more fully hereinafter set forth.

To the accomplishment of this object and such others as may hereinafter appear, the invention consists of the parts and combination of parts hereinafter fully described, and particularly pointed out in the appended claims, reference being had to the accompanying drawings, forming a part of this specification, in which the same reference characters designate like parts throughout the several views.

Referring to the drawings by reference characters, A designates the main wagon-box, and B C the supplemental boxes or frames, which are supported on the main box by suitable standards, each consisting of the outer bars D and the inner bars F, these bars being bolted by bolts $d^3$ to the uppermost frame C upon opposite sides thereof and depending therefrom so as to loosely, but closely, embrace the intermediate boards of the frame B and the side-boards of the wagon-box. I preferably use six of these standards, one at each end of each side-board and one about midway the length of the same.

Keepers $b\ b'$ embrace the bars D F and are secured by bolts $b^2$ to the opposite sides of the side-boards of the frame B, these keepers serving to slidingly attach the side-boards of the frame B to the standards. When the intermediate frame B is elevated, as shown in Figs. 1 and 4, a pin $d^2$, carried by each of the bars D, engages under the keeper $b$ and serves to support said intermediate frame or box.

The inner bar or plate F of each standard slides through a keeper $f$, bolted to the inner side of the side-board of the wagon-box. The outer bar D slides vertically in a socket or guide consisting of a main plate $a$, having lateral wings $a'$ to afford a wide bearing upon the wagon-box and with ears or lugs $a^2$, which engage over the opposite edges of the bar D and serve to guide it in its vertical movements. The plate $a$ is provided near its top with a hole $a^3$, through which a fastening-screw $a^7$ is passed to secure the socket to the side-board, and at its lower end said plate $a$ is provided with a transverse slot $a^5$, through which a fastening-screw $a^6$ is passed to assist the screw $a^7$ in securing the socket to the wagon-box. The screw $a^7$ serves as a sort of pivot which will permit the lower end of the socket to swing forward or backward, and this movement of the lower end of the socket is permitted by the slot $a^5$.

To lock the standards in their elevated and lowered positions, I employ a spring-catch E, secured at its upper end to the bar D by the rivet $e$ and guided by a pin $d'$, carried by said bar D and working through a hole $e'$ in the spring. The spring near its lower end carries a pin $e^2$, which normally extends through a hole $d$ in the bar D and engages in one of a vertical series of holes $a^4$ formed in the plate $a$.

When the rack-frames or supplemental boxes are down, as shown in Fig. 2, the latch locks them down by its pin $e^2$, being in engagement with the lowermost hole $a^4$. When it is desired to raise the upper rack or frame, the latches are disengaged and the standards raised until the latch-pin $e^2$ snaps into the middle one of the holes $a^4$, in which position the upper frame C will be locked in a position above the frame B, as shown in Fig. 3. When it is desired to elevate both the frames, as shown in Figs. 1, 4, and 5, the standards are raised until the latch-pins $e^2$ snap into the uppermost hole $a^4$. As the standards are raised the intermediate frame B is raised by the pins $d^2$ engaging the keepers $b$.

The pivotal movement of the sockets is advantageous in permitting the racks to be raised at one end before they are raised at the other end without binding or injury to the parts, as shown in the dotted lines in Fig. 4. This provision for permitting the frames to be raised at one end at a time enables the frames to be raised and locked by one man, whereas if the sockets were rigid and the standards nicely fitted in them it would be necessary to have at least two men to raise the frames in view of the fact that they would have to be kept substantially horizontal during the elevating process.

It will be apparent to those skilled in the art that various mechanical embodiments of the invention are possible, and I therefore do not wish to be limited to the exact arrangement and construction shown.

What I claim, and desire to secure by Letters Patent, is—

1. In combination with a wagon-box, of a pair of separate supplemental frames superposed thereon, and means whereby these frames are locked down on the upper edge of the wagon-box or held above the same and separated from each other, substantially as set forth.

2. In combination with a wagon-box, of a pair of supplemental frames, and means for holding these frames on the upper edge of the wagon-box or elevated above the same and separated from each other, said means embodying vertical standards attached to the frames and having their lower ends working in sockets carried by the wagon-box.

3. In combination with a wagon-box provided with a series of stake-sockets pivotally mounted on the wagon-box, standards or stakes adapted to slide in these sockets and carrying a supplemental frame or box at their upper ends, and means for locking the standards in their raised position.

4. In combination with a wagon-box carrying a series of stake-sockets, each socket being pivoted at its upper end so as to swing forward and backward at its lower end, a stake working vertically in each socket and means for locking the stake in its elevated position, and a supplemental frame or frames supported on the stakes.

5. In combination with a wagon-box provided with a series of stake-sockets each pivoted at its upper end so that its lower end will have a forward and backward movement, a fastening device for the lower end of the socket, a supporting-stake working in each socket and means for locking it in its elevated position, and a supplemental frame or frames mounted on the stakes.

6. In combination with a wagon-box carrying a series of stake-sockets, each socket consisting of a plate provided with a vertical series of latch-receiving holes, a stake working vertically in each socket and carrying a spring-latch adapted to engage in one of said holes, and a supplemental frame or frames carried by the stakes, for the purpose set forth.

7. In combination with a wagon-box carrying a series of sockets, a stake working vertically in each socket and means for locking the stake in its elevated position, a top frame or rack attached to the stakes, an intermediate frame slidingly mounted on the stakes, and means for lifting and holding up the intermediate frame when the stakes are raised above a predetermined point, for the purpose set forth.

In testimony whereof I hereunto affix my signature, in the presence of two witnesses, this 4th day of September, 1905.

MOSES LENHART.

Witnesses:
J. L. WITT,
O. A. BARTHOLOMEW, Jr.